United States Patent
Fischer (10) Patent No.: US 9,179,502 B2
(45) Date of Patent: Nov. 3, 2015

(54) MULTIPLE DELIVERY TRAFFIC INDICATION MAP (DTIM) PER DEVICE WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventor: Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 201 days.

(21) Appl. No.: 13/911,877

(22) Filed: Jun. 6, 2013

(65) Prior Publication Data

US 2013/0336245 A1    Dec. 19, 2013

Related U.S. Application Data (60) Provisional application No. 61/660,789, filed on Jun. 17, 2012, provisional application No. 61/826,744, filed on May 23, 2013.

(51) Int. Cl.
*H04W 88/10* (2009.01)
*H04W 74/04* (2009.01)
(Continued)

(52) U.S. Cl.
CPC ............ *H04W 88/10* (2013.01); *H04B 7/0689* (2013.01); *H04W 74/04* (2013.01); *H04W 48/12* (2013.01)

(58) Field of Classification Search
None
See application file for complete search history.

(56) References Cited

U.S. PATENT DOCUMENTS 7,379,435 B1 *   5/2008  Kinder ................... 370/324
2007/0195727 A1 * 8/2007 Kinder et al. ............ 370/328
(Continued)

FOREIGN PATENT DOCUMENTS

JP     2011217026 A    10/2011
KR   1020080083086 A    9/2008

OTHER PUBLICATIONS

European Patent Office; European Search Report; EP Application No. 13002976.2; Oct. 31, 2013; 3 pgs.
Liu; DCF Enhancements for Large Number of STAs; IEEE Draft; Sep. 19, 2011; pp. 1-11; vol. 802.11ah 11-11-1255-00-00ah-dcf-enhancements-for-large-number-of-stas.
(Continued)

*Primary Examiner* — Kerri Rose
(74) *Attorney, Agent, or Firm* — Garlick & Markison; Shayne X. Short (57) ABSTRACT

Communications are coordinated between different respective wireless communication device groups in a multiple delivery traffic indication map (DTIM) per device signaling scheme. Different respective wireless communication devices (e.g., wireless stations (STAs)) may communicate with a manager/coordinator wireless communication device (e.g., access point (AP)) at different times and for different reasons. The manager/coordinator wireless communication device generates and transmits beacons to the wireless communication devices specifying times during which communications may be supported with the manager/coordinator wireless communication device. A restricted access window (RAW) information element (IE) within a beacon includes at least one restricted access window (RAW) to specify a wireless communication device authorized to communicate with the manager/coordinator wireless communication device. Different wireless communication device groups may communicate with the manager/coordinator wireless communication device at different periodicities, and any one wireless communication device may be included in more than one wireless communication device group.

20 Claims, 9 Drawing Sheets

(51) Int. Cl.
*H04B 7/06* (2006.01)
*H04W 48/12* (2009.01)

(56) References Cited

U.S. PATENT DOCUMENTS

| | | | |
|---|---|---|---|
| 2010/0165963 A1* | 7/2010 | Chu et al. | 370/338 |
| 2011/0205998 A1* | 8/2011 | Hart et al. | 370/330 |
| 2012/0120892 A1 | 5/2012 | Freda et al. | |
| 2013/0128798 A1* | 5/2013 | Liu | 370/312 |
| 2014/0119268 A1* | 5/2014 | Chu et al. | 370/312 |
| 2014/0328238 A1* | 11/2014 | Seok et al. | 370/311 |
| 2015/0003367 A1* | 1/2015 | Seok | 370/329 |

OTHER PUBLICATIONS

Ghosh; "Group Synchronized DCF"; IEEE Draft; Mar. 12, 2012; pp. 1-14; vol. 802.11ah 11-12-0329-00-00ah-group-synchronized-dcf.

Pantelidou; Grouping Methodology; May 15, 2012; pp. 1-14; vol. 802.11ah 11-12-0650-00-00ah-grouping-methodology.

Ghosh; Group Synchronized DCF; Mar. 13, 2012; pp. 1-13; vol. 802.11ah, No. 1 11-12-0329-01-00ah-group-synchronized-dcf.

Chu; Enhanced power save for large BSS; IEEE Draft; Jan. 19, 2012; pp. 1-9; vol. 802.11ah, No. 2 11-12-0102-02-00ah-enhanced-power-save-for-large-bss.

* cited by examiner

MULTIPLE DELIVERY TRAFFIC INDICATION MAP (DTIM) PER DEVICE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/660,789, entitled "Multiple delivery traffic indication map (DTIM) per device within single user, multiple user, multiple access, and/or MIMO wireless communications," filed Jun. 17, 2012, pending.

2. U.S. Provisional Patent Application Ser. No. 61/826,744, entitled "Multiple delivery traffic indication map (DTIM) per device within single user, multiple user, multiple access, and/or MIMO wireless communications," filed May 23, 2013, pending.

BACKGROUND

1. Technical Field

The present disclosure relates generally to communication systems; and, more particularly, to signaling within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

A manager or coordinator wireless communication device (such as an access point (AP)) may support communications with different respective wireless communication devices (e.g., wireless stations (STAs)) at different respective times. Also, a manager or coordinator wireless communication device may support communications with any one wireless communication device for very different reasons at different times. Ineffective coordination of such communications within a wireless communication system reduces the overall system's throughput and performance. Also, an individual wireless communication device's performance also suffers with inefficient and poorly coordinated use of the communication medium (e.g., air in a wireless context).

DETAILED DESCRIPTION

Figure 1:
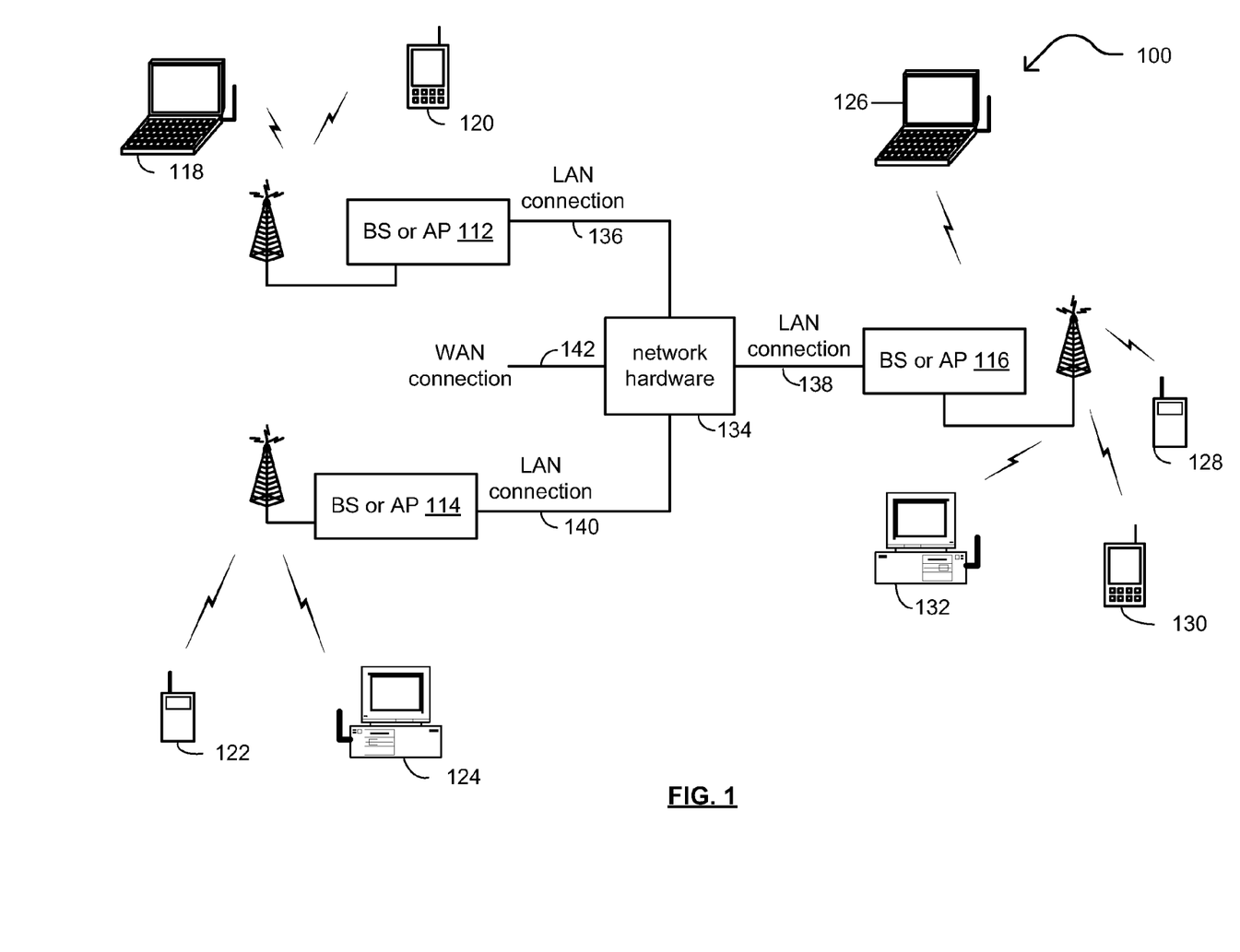
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistant 120 and 130, personal computer 124 and 132 and/or cellular telephone 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Within such a wireless communication system 100, a manager or coordinator wireless communication device may support different communications with other wireless communication devices. The manager or coordinator wireless communication device can support different devices at different times as well as communicate with any one or more devices for different purposes at different times. Generally, such communications between wireless communication devices may be referred to as streams or flows.

Multiple respective streams or data flows are supported between a manager or coordinator wireless communication device and various other wireless communication devices (e.g., wireless stations (STAs), smart meter stations (SMSTAs), etc.) within a given wireless communication network (e.g., a basic services set (BSS), etc.). In addition, a singular other wireless communication device can support communications using more than one respective stream or data flow (e.g., different flows for different purposes). Streams or data flows correspond to upstream and/or downstream communications made at appropriate times and/or in response to or based on various considerations, events, and/or conditions.

For example, a given SMSTA may operate by waking up periodically (e.g., every N seconds) to receive a given downlink stream from the manager or coordinator wireless communication device. Alternatively, a given SMSTA may operate by waking up every N1 seconds to receive a first downlink stream, every N2 seconds to receive a second downlink stream, etc. Different streams can be supported between wireless communication devices for different reasons (e.g., metering/sensing uplink data transfers, downlink metering/sensing instructions, management frame exchanges, etc.).

In another example, a given SMSTA may operate by waking up every N1 seconds to receive a first downlink stream, every N2 seconds to receive a second downlink stream, and every N3 seconds to transmit an uplink stream (e.g., to an access point (AP)), etc. Again, any one wireless communication device may support communications with a manager or coordinator wireless communication device via different streams (e.g., using and supporting different functionalities associated with different streams).

Differentiation and coordination of such communications between the manager or coordinator wireless communication device and the various wireless communication devices ensures effective use of the communication medium (e.g., one or more communication channels of a frequency spectrum that is conveyed via air) as well as ensures effective operation of the respective wireless communication devices. Some SMSTAs are energy constrained (e.g., battery powered) and proper scheduling to enter into and exit from sleep or reduced power state can extend a device's operational cycle.

Considering an example with respect to the diagram, BS or AP 116 includes per group DTIM functionality to support communications with different respective devices 126, 128, 130, and 132 at different times and for different reasons. Communications with any one of these devices may be supported using different streams or data flows. The BS or AP 116 generates and transmits beacons to the devices 126, 128, 130, and 132. These beacons include restricted access window (RAW) information elements (IEs) that specify a number of RAWs during which the devices 126, 128, 130, and 132 communicate with a BS or AP 116. Different delivery traffic indication message (DTIM) parameters may be provided for each respective RAW. For example, a beacon may include an information element that is a RAW IE. Such a RAW IE specifies one or more RAWs during which different respective groups of the devices 126, 128, 130, and 132 communicate with the BS or AP 116.

The BS or AP 116 communicates with one or more of the devices 126, 128, 130, and 132 (e.g., a first group of devices) during the respective RAWs that occur within the beacons at a first DTIM periodicity, and with one or more of the devices 126, 128, 130, and 132 (e.g., a second group of devices) during the respective RAWs that occur within the beacons at a second DTIM periodicity. Considering an example, the BS or AP 116 communicates with the first group of devices during RAWs indicated in every Nth beacon (e.g., where N is an integer), and the BS or AP 116 communicates with the second group of devices during RAWs indicated in every Mth beacon (e.g., where M is an integer). Generally, the BS or AP 116 communicates with different respective groups of devices (uplink and/or downlink) in the various RAWs. A wireless communication device group may include as few as one device, and a device may be in more than one wireless communication device group. Also, there may be instances in which a given RAW may be repeated within a beacon interval, such as when a given wireless communication device group may need more than one RAW within a single DTIM period. The different respective DTIM periodicities may be integer multiples of one of the DTIM periods or a base DTIM period.

As the BS or AP 116 transmits beacons to the devices 126, 128, 130, and 132, communications between the BS or AP 116 and different respective groups of those devices 126, 128, 130, and 132 are supported during those RAWs specified within the RAW IEs of the beacons. This allows for coordination of uplink and/or downlink communication between the BS or AP 116 and the devices 126, 128, 130, and 132, as well as an effective usage of the communication medium.

Figure 2:
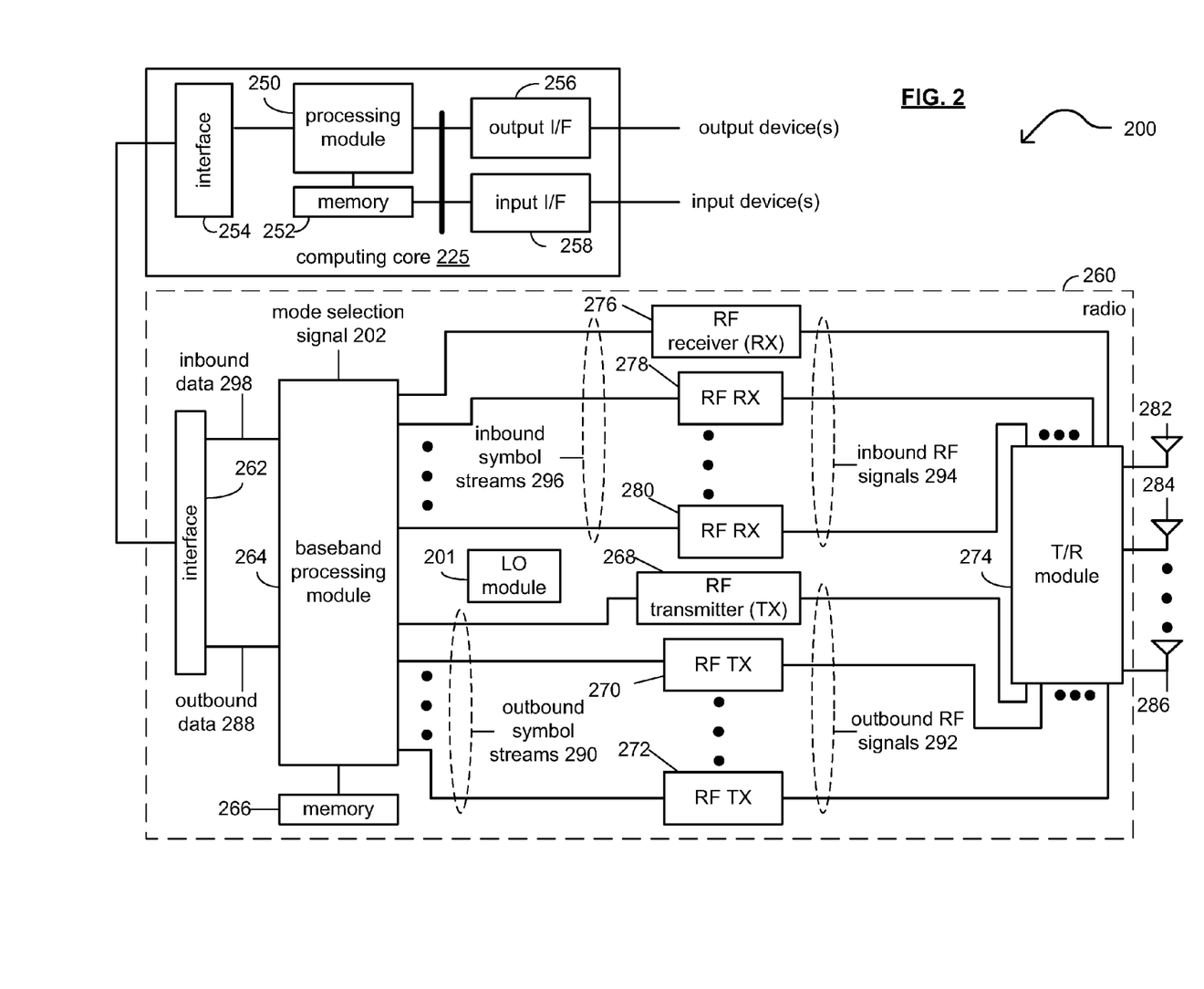
FIG. 2 is a diagram illustrating one or more embodiments of a wireless communication device that includes a computing core and an associated radio.

FIG. 2 is a diagram illustrating one or more embodiments 200 of a wireless communication device 118-132 (e.g., as in FIG. 1) that includes a computing core 225 and an associated radio 260. The computing core 225 includes a processing module 250, memory 252, an interface 254, input interface 258 and output interface 256. The radio 260 includes an interface 262, a baseband processing module 264, memory 266, radio frequency (RF) transmitters (TXs) 268-272, a transmit/receive (T/R) module 274, antennae 282-286, RF receivers (RXs) 276-280, and a local oscillation module 201.

The interfaces 254 and 262 (e.g., buses, connectors, IC traces, IC pins, etc.) allow for data to be communicated between the computing core 225 and the radio 260. For data from the radio 260 to the computing core 225 (e.g., inbound data), the interface 254 provides the data to the processing module 250 for further processing and/or routing to the output interface 256. The output interface 256 provides connectivity to one or more output display devices such as a display, monitor, speakers, etc. such that the received data may be displayed. The interface 254 also provides data from the processing module 250 to the radio 260. The processing module 250 may receive the outbound data from one or more input devices such as a keyboard, keypad, microphone, etc. via the input interface 258 or generate the data itself.

The baseband processing module 264 of the radio, in combination with operational instructions stored in memory 266, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion.

In an example of operation, the radio 260 receives outbound data 288 from the computing core and, based on a mode selection signal 202, produces one or more outbound symbol streams 290. For example, the mode selection signal 202 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. Also, in such mode selection tables, a code rate is supplied as well as number of coded bits per subcarrier (NBPSC), coded bits per OFDM symbol (NCBPS), data bits per OFDM symbol (NDBPS). The mode selection signal may also indicate a particular channelization for the corresponding mode, which for the information in one of the mode selection tables with reference to another of the mode selection tables. Other types of channels, having different bandwidths, may be employed in other embodiments.

The baseband processing module 264, based on the mode selection signal 202 produces the one or more outbound symbol streams 290 from the output data 288. For example, if the mode selection signal 202 indicates that a single transmit antenna is being utilized for the particular mode that has been selected, the baseband processing module 264 will produce a single outbound symbol stream 290. Alternatively, if the mode selection signal indicates 2, 3 or 4 antennas, the baseband processing module 264 will produce 2, 3 or 4 outbound symbol streams 290 corresponding to the number of antennae from the output data 288.

Depending on the number of outbound streams 290 produced by the baseband module 264, a corresponding number of the RF transmitters 268-272 will be enabled to convert the outbound symbol streams 290 into outbound RF signals 292. The transmit/receive module 274 receives the outbound RF signals 292 and provides each outbound RF signal to a corresponding antenna 282-286.

When the radio 260 is in the receive mode, the transmit/receive module 274 receives one or more inbound RF signals via the antennae 282-286. The T/R module 274 provides the inbound RF signals 294 to one or more RF receivers 276-280. The RF receiver 276-280 converts the inbound RF signals 294 into a corresponding number of inbound symbol streams 296. The number of inbound symbol streams 296 will correspond to the particular mode in which the data was received. The baseband processing module 264 receives the inbound symbol streams 296 and converts them into inbound data 298, which is provided to the computing core 225.

In an embodiment, the radio 260 includes a transmitter and a receiver. The transmitter may include a MAC module, a PLCP module, and a PMD module. The Medium Access Control (MAC) module, which may be implemented with the baseband processing module 264, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the baseband processing module 264, is operably coupled to convert the MPDU into a PLCP Protocol Data Unit (PPDU) in accordance with the WLAN protocol. The Physical Medium Dependent (PMD) module is operably coupled to convert the PPDU into radio frequency (RF) signals in accordance with one of the operating modes of the WLAN protocol, wherein the operating modes includes multiple input and multiple output combinations.

An embodiment of the Physical Medium Dependent (PMD) module includes an error protection module, a demultiplexing module, and direction conversion modules. The error protection module, which may be implemented in the processing module 264, is operably coupled to restructure a PPDU (PLCP (Physical Layer Convergence Procedure) Protocol Data Unit) to reduce transmission errors producing error protected data. The demultiplexing module is operably coupled to divide the error protected data into error protected data streams. The direct conversion modules are operably coupled to convert the error protected data streams into radio frequency (RF) signals.

The wireless communication device of FIG. 2 may be implemented using one or more integrated circuits based on a desired configuration, combination, and/or components, modules, etc. within one or more integrated circuits. The wireless communication device also supports communications with other devices in a wireless communication system based upon RAW IEs included within beacons. Accordingly, the wireless communication device of this diagram may be BS or AP, a STA, a SMSTA, or generally any device that supports wireless communications.

Figure 3:
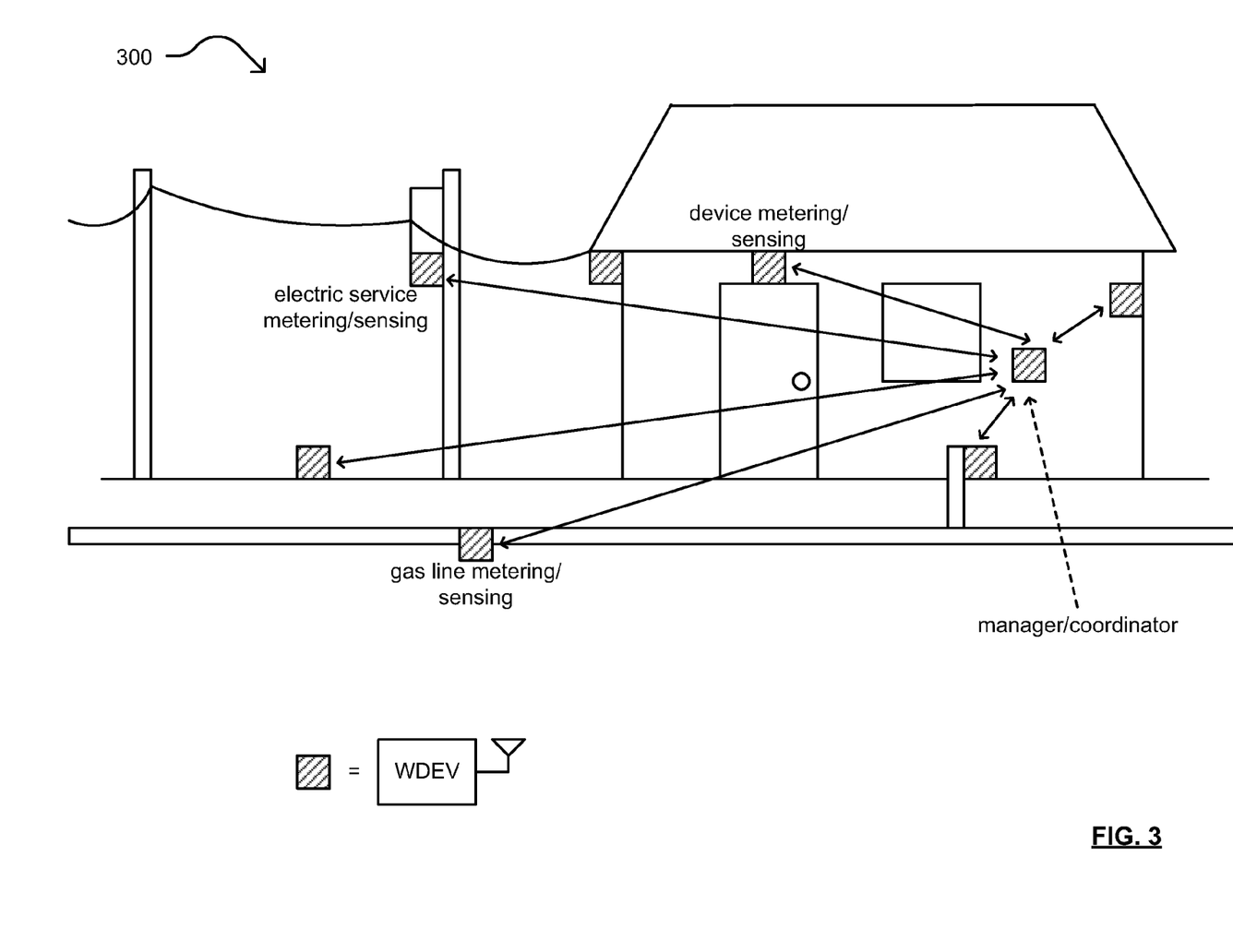
FIG. 3 is a diagram illustrating an embodiment of a number of wireless communication devices, some operative as smart meter stations (SMSTAs).

FIG. 3 is a diagram illustrating an embodiment 300 of a number of wireless communication devices, some operative as smart meter stations (SMSTAs), implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices (e.g., from the SMSTAs to an AP).

For example, a wireless communication device may be implemented as a smart meter station (SMSTA). A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode, a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.).

In addition and/or in the alternative, a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data acquired during those operations may be stored (e.g., in a memory storage component within the device). Then, during a subsequent operational mode dedicated for transmission of the data, multiple data portions corresponding to multiple respective sensing and/or monitoring operations may be transmitted during that operational mode dedicated for transmission of the data.

In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP. Generally speaking, such wireless communication devices may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes.

Different respective monitors and/or sensors may be implemented to provide information related to such monitoring and/or sensing functions wirelessly to the manager/coordinator wireless communication device. Such information may be provided continuously, sporadically, intermittently, etc. as may be desired in certain applications.

In addition, communications between a manager/coordinator wireless communication device of the different respective monitors and/or sensors may be cooperative in accordance with such bidirectional communications, in that, the manager/coordinator wireless communication device may direct the respective monitors and/or sensors to perform certain related functions at subsequent times.

Different monitoring/sensing operations may need to be performed at different respective times. For example, gas line metering or sensing may be performed relatively less frequently than electric service metering or sensing. Also, security based sensing, such as detection of a door or window being ajar, may be critical in nature and preferably be performed almost continuously. A variety of different communications are provided to the manager/coordinator wireless communication device from different sensing devices (e.g., SMSTAs) that perform different operations and functions. In this diagram, a manager/coordinator wireless communication device generates beacons that include RAW IEs and transmits them to other wireless communication devices (e.g., SMSTAs) in the system.

The manager/coordinator wireless communication device supports subsequent communications with the other wireless communication devices (e.g., SMSTAs) on a per group basis. A given group may include as few as one wireless communication device (e.g., one SMSTA). Alternatively, a group may include more than one wireless communication device, and different groups may include a common wireless communication device. The manager/coordinator wireless communication device supports subsequent communications with the other wireless communication devices (e.g., SMSTAs) based upon the RAWs specified within the RAW IEs of the beacons according to different respective DTIM periodicities.

The following four diagrams show communication between an AP and a number of STAs at different respective times. The AP communicates with different respective groups of STAs during each of the respective times. It is noted that a group may include as few as one STA, as many as all STAs, or any number of the STAs in between.

Figure 4A:
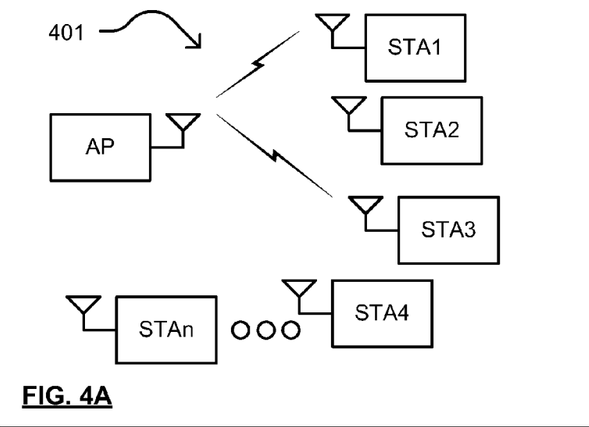
FIG. 4A is a diagram illustrating an example of communications between wireless communication devices in an embodiment of a wireless communication system.

FIG. 4A is a diagram illustrating an example 401 of communications between wireless communication devices in an embodiment of a wireless communication system. This diagram shows communication being supported between the AP and a first group of wireless communication device that includes STA1 and STA3.

Figure 4B:
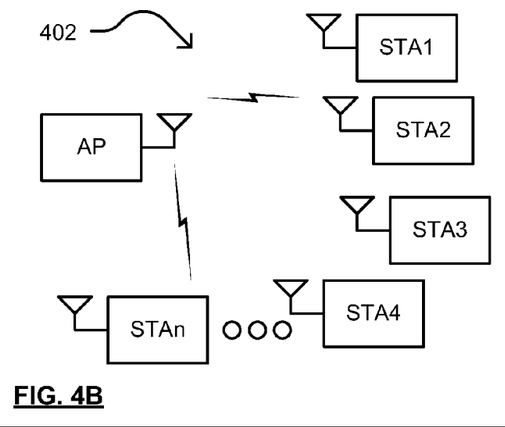
FIG. 4B is a diagram illustrating another example of communications between wireless communication devices in an embodiment of a wireless communication system.

FIG. 4B is a diagram illustrating another example 402 of communications between wireless communication devices in an embodiment of a wireless communication system. This diagram shows communication being supported between the AP and a second group of wireless communication devices that includes STA2 and STAn.

Figure 4C:
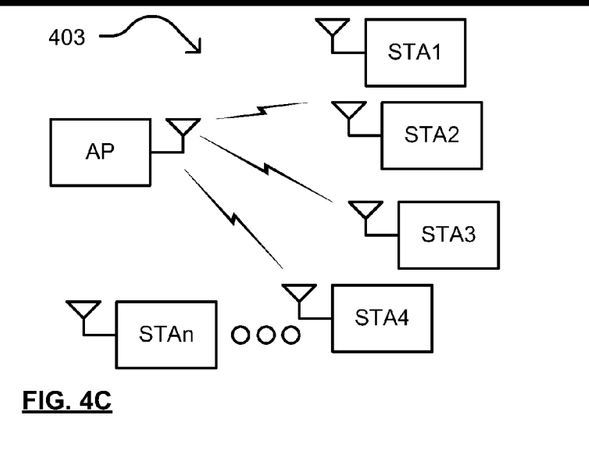
FIG. 4C is a diagram illustrating yet another example of communications between wireless communication devices in an embodiment of a wireless communication system.

FIG. 4C is a diagram illustrating yet another example 403 of communications between wireless communication devices in an embodiment of a wireless communication system. This diagram shows communication being supported between the AP and a third group of wireless communication devices that includes STA2, STA3, and STA4.

Figure 4D:
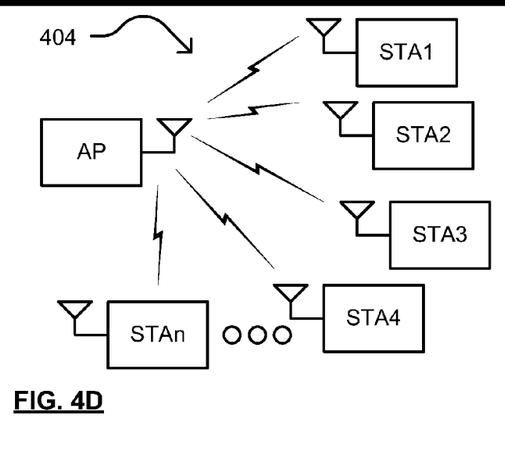
FIG. 4D is a diagram illustrating yet another example of communications between wireless communication devices in an embodiment of a wireless communication system.

FIG. 4D is a diagram illustrating yet another example 404 of communications between wireless communication devices in an embodiment of a wireless communication system. This diagram shows communication being supported between the AP and a fourth group of wireless communication devices that includes STA1 through STAn.

In FIGS. 4A-4D, four separate wireless communication device groups are shown, wherein the AP uses beacons that include restricted access window (RAW) information elements (IEs). For example, if the AP transmits beacons including RAW IEs indicating the RAWs for these STAs to communicate with the AP, then a first beacon could include a RAW IE specifying RAWs for group 1 (e.g., STA1 and STA2 of FIG. 4A). As another example, the AP transmits a second beacon that includes a RAW IE specifying RAWs for STA2 and STAn for FIG. 4B. The AP would also transmit respective beacons for the groups of FIG. 4C and FIG. 4D.

Figure 5:
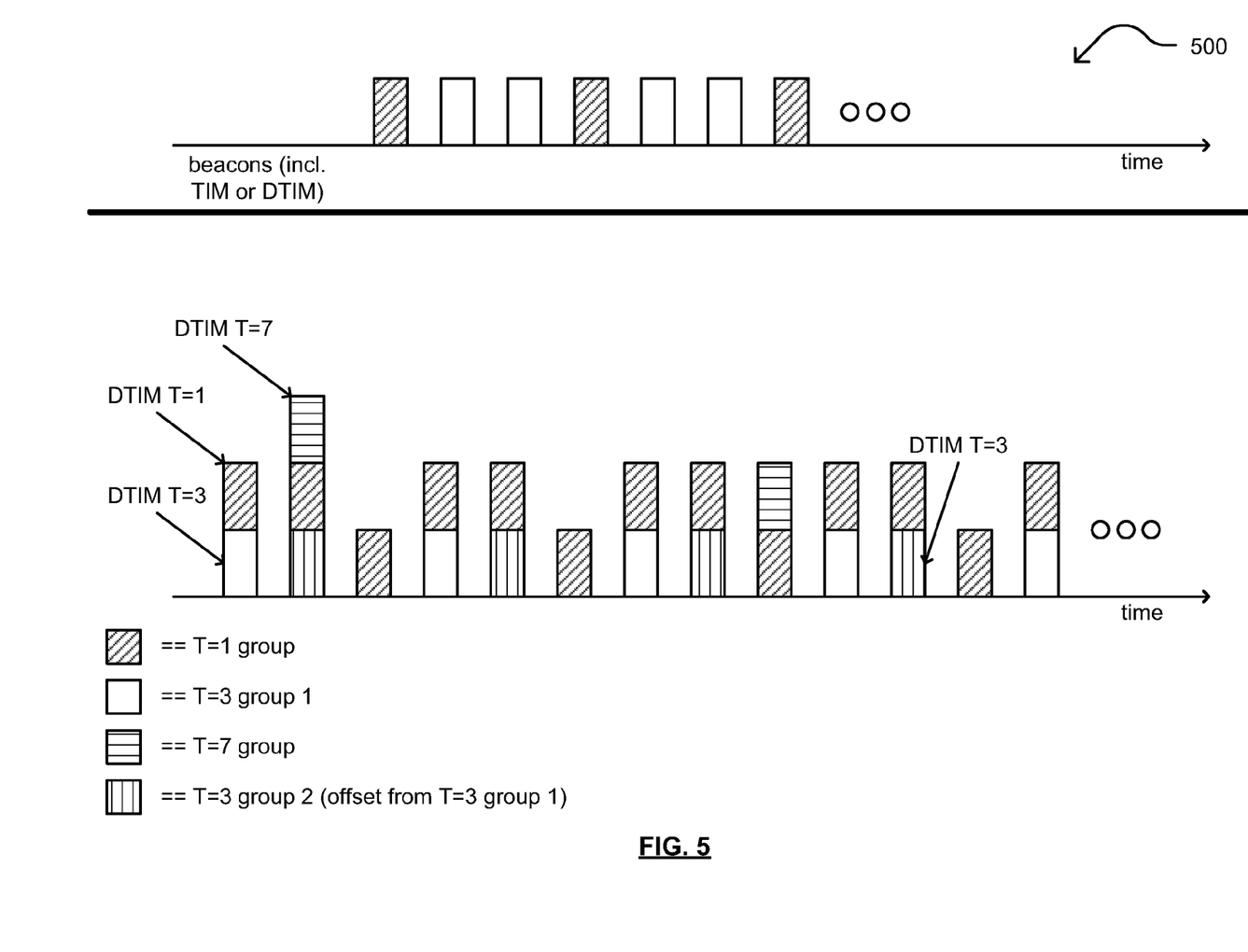
FIG. 5 is a diagram illustrating an example of beacons that may include more than one delivery traffic indication message (DTIM) sub-structure.

FIG. 5 is a diagram illustrating an example 500 of beacons that may include more than one delivery traffic indication message (DTIM) sub-structure. The top of this diagram shows beacons transmitted from an AP as a function of time. Generally, a traffic indication map (TIM) or delivery traffic indication message (DTIM) may be included as an information element within any given beacon to indicate that the AP includes one or more buffered frames intended for a STA. In this example, the first, fourth, and seventh beacon are shown to include a TIM or DTIM indicating the AP has one or more buffered frames intended for a STA.

In an example of using beacons, any one or more respective wireless communication devices (e.g., STAs) within a wireless communication network (e.g., a basic services set (BSS), etc.) may operate to listen for a beacon before a listen interval, and the network coordinator or manager (e.g., an access point (AP)) may periodically send such a bitmap on one or more of its respective begins as an information element (IE). The bit mask is called the traffic indication map (TIM) and may consist of a particular number of bits (e.g., 2008 in one embodiment), such that each respective bit represents the association ID (AID) of a particular one of the wireless communication devices (e.g., STAs). In certain embodiments, a smaller TIM bitmap may be employed if it is expected that less than all of the wireless communication devices (e.g., STAs) will be awake such that certain of them may be asleep. In certain situations, bitmap values passed within the TIM information element may be referred to as a partial virtual bitmap, and in such situations in which transmission of only a partial bitmap is employed, additional fields (e.g., bitmap control in length) of the TIM information element may optionally be employed to accommodate this particular operational mode.

In another example of using beacons, when a wireless communication device awakens from a sleep or reduced power state, it may determine whether or not a corresponding AID value associated therewith (e.g., within the TIM) is set that indicates the AP has one or more buffered frames intended for it. Also, a delivery traffic indication message (DTIM) may employed so that a given wireless communication device is provided a suggested wait time, and such a suggested wait time may be viewed as being a multiple integer of the beacon interval. For example, a given wireless communication device may be directed to awaken every Nth beacon interval (e.g., where N=2, 3, 4, and/or any other integer value etc., for awakening at suggested times) so that that particular wireless communication device need not necessarily awaken each and every beacon interval and attempt to process information associated with the beacon (e.g., such as monitoring its respective AID value therein). The bottom portion of the diagram shows four different wireless communication device groups that will communicate with the AP at different respective times. Each respective beacon may include more than one DTIM sub-structure to indicate more than one wireless communication device group that is to communicate within that beacon interval. Such a beacon will include a RAW IE that specifies the appropriate RAWs during which the wireless communication device groups may communicate with the AP.

As also mentioned above, there may be multiple respective streams or data flows (upstream and/or downstream) associated with the various wireless communication devices (e.g., STAs, SMSTAs, etc.) within a given wireless communication network (e.g., a basic services set (BSS), etc.). Also, different respective streams or data flows may have different respective characteristics (e.g., periodicities which may be greater than or less than a beacon interval (BI), different respective offsets, etc.). With different respective periodicities associated with different respective streams, more than one respective stream may align together at any given DTIM. Also, since different respective streams may have different respective offsets (e.g., even if such different respective streams have the same periodicity), streams having a common periodicity may be relatively offset with respect to each other. This DTIM related information is included within a RAW of a RAW IE.

Moreover, different respective streams may be made in different respective directions (e.g., some streams uplink only, others streams downlink only, while other streams corresponding to both uplink and downlink). Also, different respective communications may have different respective packet durations (e.g., depending on the amount of information to be conveyed in one or both directions).

For example, when operating in accordance with DTIM functionality associated with one or more beacons, a given wireless communication device will awaken at those particular beacon times or beacon intervals corresponding thereto.

Referring again to the bottom portion of the diagram, more than one respective DTIM sub-structure may be included within a beacon, and a given wireless communication device may be associated with more than one respective DTIM sub-structure. As such, a given wireless communication device may awaken based upon different respective DTIM sub-structures (e.g., awaken based upon a first DTIM sub-structure having a first periodicity, and also awaken based upon a second DTIM sub-structure having a second periodicity, etc.). As may be understood, for different respective operations which may be associated with different respective streams, the use of employing more than one different respective DTIM sub-structures within a given beacon allows for great selectivity and adaptability in terms of ensuring that any of a number of respective streams may be appropriately serviced by one or more wireless communication devices.

Considering the bottom portion of the diagram, looking at the beacon at the left-hand side of the diagram, two (2) DTIM sub-structures are included within the beacon each corresponding to different respective periodicities. A DTIM sub-structure having a periodicity of 1 (e.g., T=1 group) occurs at every single beacon or beacon interval. However, the DTIM sub-structure having a periodicity of 3 (e.g., T=3 group 1) occurs only at every third beacon or beacon interval. Also, in the second leftmost beacon at the left-hand side of the diagram, three (3) DTIM sub-structures are included within the beacon each corresponding to different respective periodicities [e.g., the DTIM sub-structure having a periodicity of 1 (e.g., T=1 group), a DTIM sub-structure having a periodicity of 7 (e.g., T=7 group), as well as a second DTIM sub-structure having a periodicity of 3 (e.g., T=3 group 2) that is relatively offset with respect to the DTIM sub-structure having a periodicity of 3 (e.g., T=3 group 1)].

Also, given the different respective periodicities of different respective DTIM groups as well as different respective offsets which may sometimes be associated with different respective DTIM groups, there may be some instances in which more than one DTIM group coincides at any given DTIM, beacon or beacon interval (e.g., for example, the DTIM sub-structure having a periodicity of 1 (e.g., T=1 group) will actually coincide or intersect with each and every other DTIM substructure group). Analogously, the DTIM sub-structure having a periodicity of 7 (e.g., T=7 group) will coincide or intersect with the DTIM sub-structure having a periodicity of 3 (e.g., T=3 group 1) every 21st DTIM, beacon or beacon interval.

Figure 6:
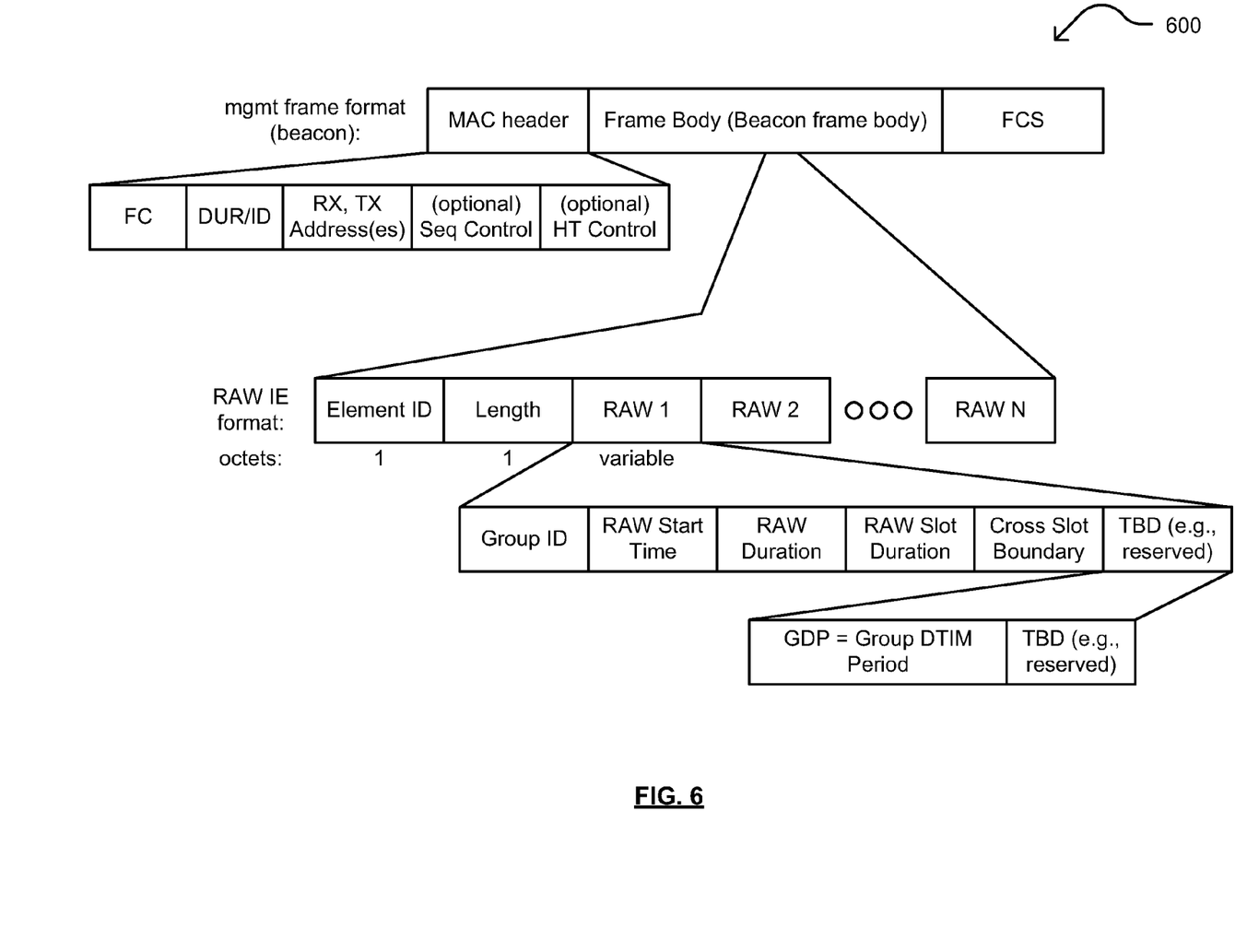
FIG. 6 is a diagram illustrating an embodiment of a restricted access window (RAW) information element (IE), within a beacon management frame, that includes per group DTIM information.

FIG. 6 is a diagram illustrating an embodiment 600 of a restricted access window (RAW) information element (IE), within a beacon management frame, that includes per group DTIM information. The top of the diagram shows a general format of a management frame. Generally speaking, a frame employed within such wireless communications includes the following basic components: media access control (MAC) header, a frame body, and a frame check sequence (FCS). In certain embodiments, the MAC header includes fields for each of frame control (FC), duration (DUR/ID), address (e.g., receiver and/or transmitter addresses), sequence control information, optional Quality of Service (QoS) Control information (e.g., for QoS data frames only), and HT Control fields (+HTC frames only) (optional fields). Note that such a frame structure is illustrative and an example of such a frame structure, and alternative embodiments of frame structures may also be employed.

Generally speaking, at least one restricted access window (RAW) information element (IE) is included in the beacon frame body to specify any number of restricted access windows (RAWs) as well as the corresponding DTIM sub-structure associated therewith. As may be understood, a given DTIM has an associated sub-structure associated with it, and each one also is associated with a given wireless communication device group (or stream group). Correlation between those wireless communication devices associated with a given group ensures communications are performed appropriately so that all associated streams related to a given DTIM group are appropriately serviced. Also, one or more DTIM parameters may be included for each respective restricted access window (RAW). For example, GDP is the count of BIs between successive DTIMs for this group. If GDP=1, then this group has a RAW every target beacon transmission time (TBTT). If GDP=2, then this group has a RAW every other TBTT. Group ID (or GROUP ID) for a RAW implies that this is a DTIM, no DTIM count needed.

Again, each RAW corresponds to one respective wireless communication device group. For example, in certain embodiments, for each respective RAW, one respective association ID (AID) or group AID (e.g., a wireless communication device group) may be employed such that each respective group will have a RAW following the corresponding and associated beacon including the DTIM sub-structure associated therewith. As such, DTIM information may be associated on a per group basis among the respective wireless communication devices within the system.

Figure 7:
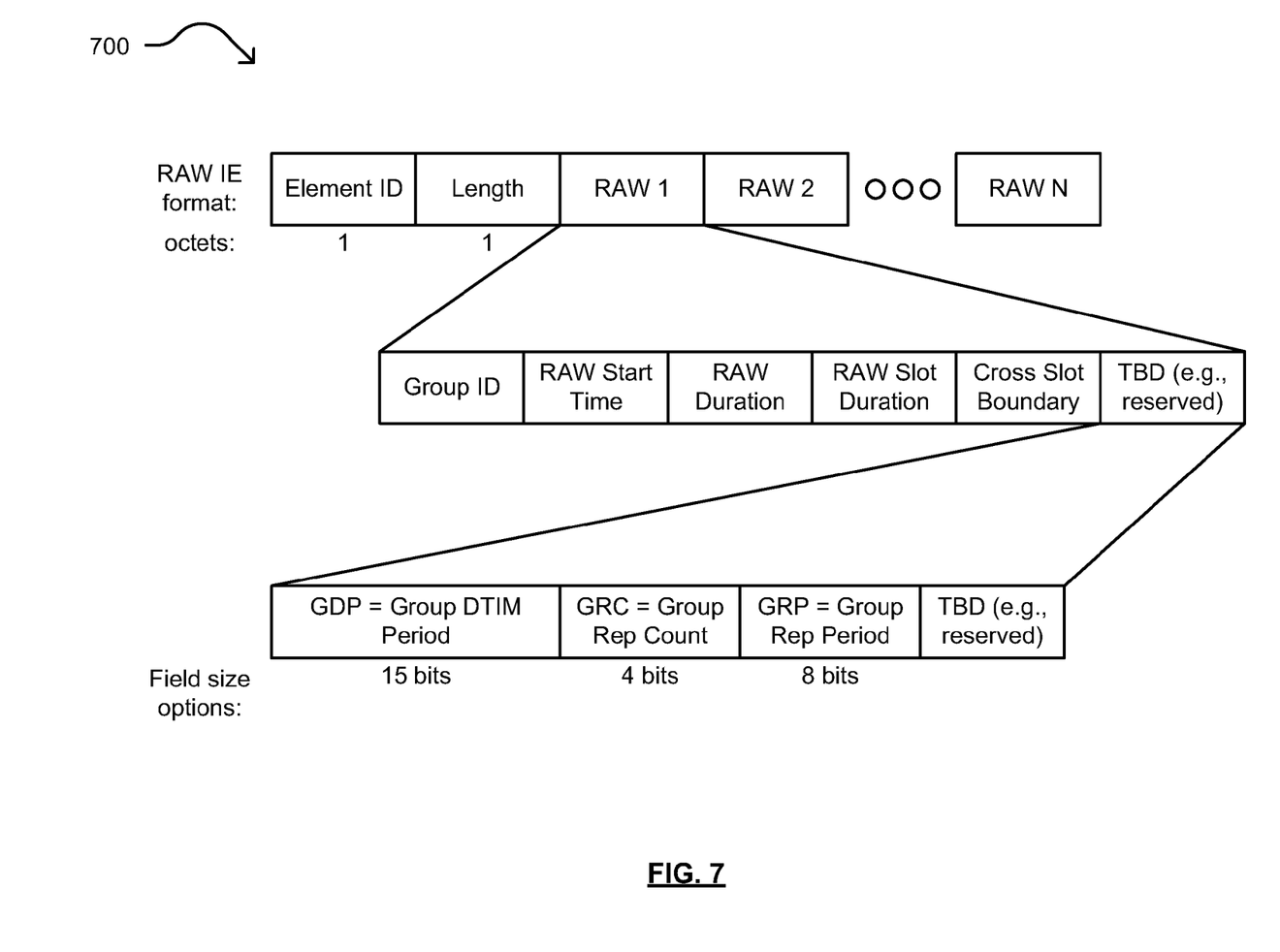
FIG. 7 illustrates an embodiment of a RAW IE, within a beacon management frame, that indicates sub-beacon interval (sub-BI) periodicity.

FIG. 7 illustrates an embodiment 700 of a RAW IE, within a beacon management frame, that indicates sub-beacon interval (sub-BI) periodicity. In situations in which a particular stream's periodicity is less than the beacon interval (BI), a corresponding group may be implemented within associated more than one restricted access window (RAW) within a single DTIM. For example, considering a particular group, Group=5, with a periodicity of 10.035 ms, and an associated beacon interval of 100.352 ms (i.e., 98×1024), and with a DTIM periodicity=1, then 10 restricted access windows (RAWs) per DTIM (e.g., 10 RAWs within one respective beacon interval (BI). There may be a significant amount of overhead if individual RAWs are created and included for each repetition of the RAW within the BI.

It is noted within this particular diagram as well as with respect to others, any desired respective sizes of the respective fields therein may be employed in various embodiments (e.g., a great deal of latitude is left to implementation design and selection such as may be determined by a designer or implementer of such functionality within one or more respective wireless communication devices within a wireless communication system). For example, in one possible embodiment, the group DTIM period (GDP) may include 15 bits, the group repetition count (GRC) may include 4 bits, and the group repetition period (GRP) may include 8 bits. The GRC is a count of group RAW repetitions for this BI. For example, if GRC=0, there is one repetition (1×) of RAW within this BI. If GRC=1, 2× of RAW within this BI, and so on. GRP is the period of group RAW repetitions for this BI.

An example of the size of GDP (Group DTIM Period) field being 15 bits is shown below:
10 seconds x+/−20 ppm=400 microseconds
100 seconds x+/−20 ppm=4 milliseconds (1.7 minutes)
1000 seconds x+/−20 ppm=40 milliseconds (17 minutes)
3600 seconds x+/−20 ppm=144 milliseconds (1 Hour)
BI 100.352 milliseconds
Group DTIM period larger than 3600 seconds is not useful because of clock drift
3600/100.352e−3=36,000 which is close to 32767 which is 15 bits Considering this example above, if the beacon interval (BI) were to increase, then the GDP field may also need to increase correspondingly.

An example of the size of GRC (Group Repetition Count) field being 4 bits is shown below:
BI 100.352 milliseconds
Minimum stream periodicity ~10 milliseconds
Maximum GRC 100/10=10=4 bits
If BI increases, then GRC might need to increase correspondingly.

Considering this example above as well, if the BI were to increase, then the GRC field may also need to increase.

Also, an example of the size of GRP (Group Repetition Period) field being 8 bits is shown below:
Typical BI 100.352 milliseconds
Maximum stream repetition period equal to maximum BI
Resolution 0.5 milliseconds
100/0.5=200 round up to 255 which is 8 bits Similarly, considering this example above as well, if the BI were to increase, then the GRP field may also need to increase.

In certain possible embodiments, four (4) respective bytes may be added per RAW description; however, not all respective RAWs necessarily need this description. In one possible embodiment, one respective bit may be added to the RAW description to indicate a presence of GRC and GRP fields so that those respective fields may be appropriately handled in those situations in which they do in fact occur.

Figure 8:
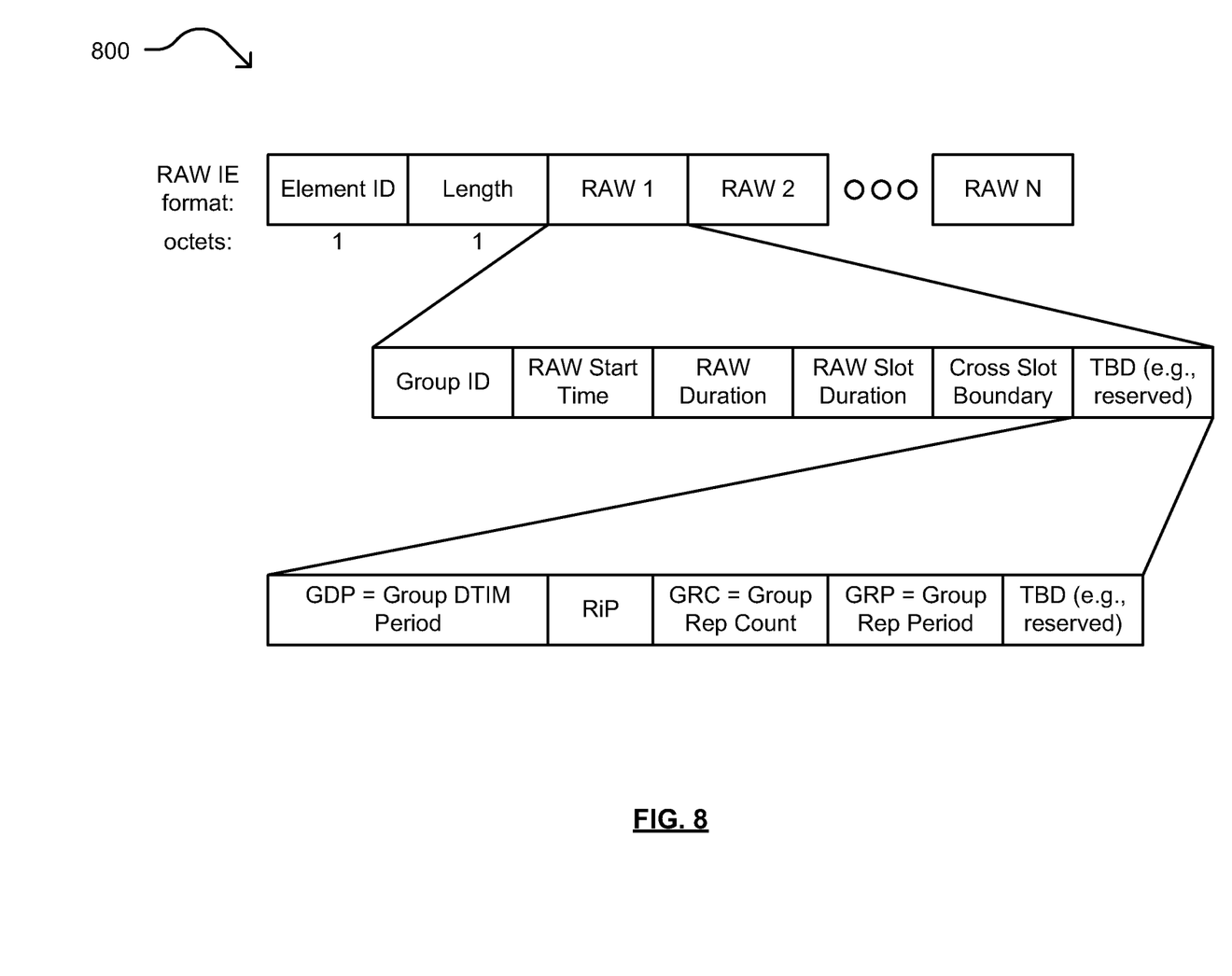
FIG. 8 illustrates an embodiment of a RAW IE, within a beacon management frame, that includes a group repetition count (GRC) and/or group repetition period (GRP) added present bit and/or information.

FIG. 8 illustrates an embodiment 800 of a RAW IE, within a beacon management frame, that includes a group repetition count (GRC) and/or group repetition period (GRP) added present bit and/or information. This respective diagram shows the inclusion of a RiP bit to indicate whether or not any repetition information is present, and this may signal the presence or absence of the respective GRC and GRP fields.

Figure 9:
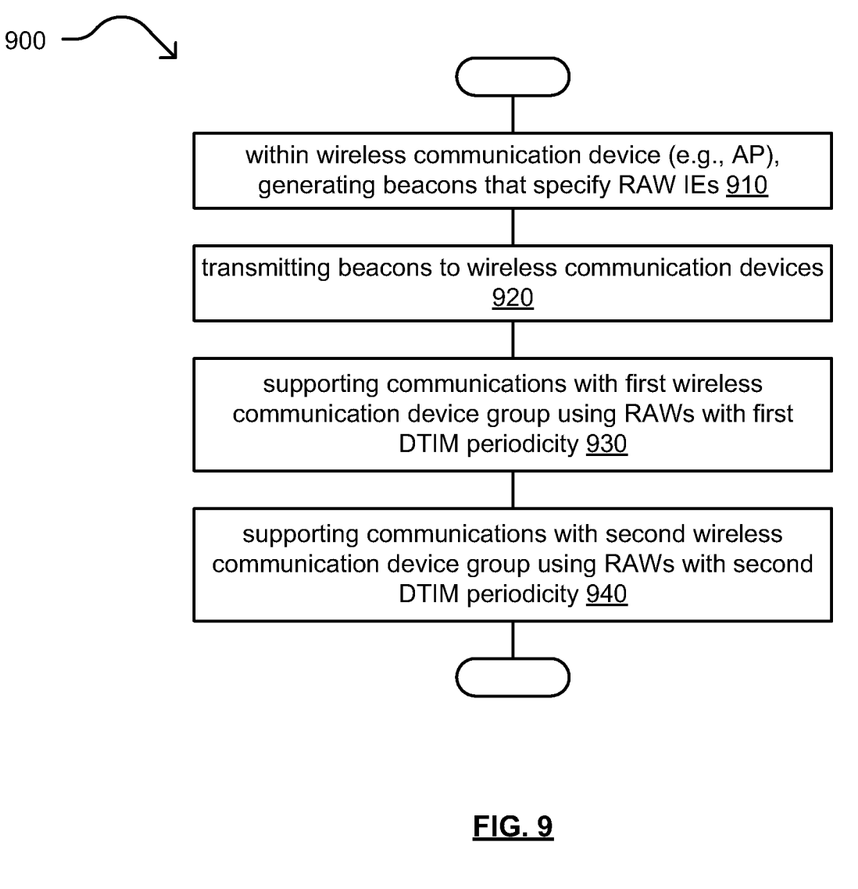
FIG. 9 is a diagram illustrating an embodiment of a method for execution by one or more wireless communication devices.

FIG. 9 is a diagram illustrating an embodiment of a method 900 for execution by one or more wireless communication devices. The method 900 begins by generating a plurality of beacons having a plurality of restricted access window (RAW) information elements (IEs) that specify a plurality of RAWs for a plurality of wireless communication device groups to communicate with the wireless communication device, as shown in a block 910. The method 900 then operates by transmitting the plurality of beacons to a plurality of wireless communication devices, as shown in a block 920.

The method 900 then continues by supporting first communications with a first wireless communication device group during first RAWs having a first delivery traffic indication message (DTIM) periodicity, as shown in a block 930. Also, the method 900 operates by supporting second communications with a second wireless communication device group during second RAWs having a second DTIM periodicity, as shown in a block 940.

It is noted that the various operations and functions described within various methods herein may be performed within a wireless communication device (e.g., such as by the baseband processing module 264, the processing module 250 as described with reference to FIG. 2) and/or other components therein. Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," "processing unit" and/or "processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, at least one of the processor or the communication interface configured to:
generate a plurality of beacons having a plurality of restricted access window (RAW) information elements (IEs) that specify a plurality of RAWs for a plurality of wireless communication device groups to communicate with the wireless communication device;
transmit the plurality of beacons to a plurality of wireless communication devices;
support first communications with a first wireless communication device group during first RAWs having a first delivery traffic indication message (DTIM) periodicity; and
support second communications with a second wireless communication device group during second RAWs having a second DTIM periodicity.

2. The wireless communication device of claim 1, wherein the at least one of the processor or the communication interface is further configured to support the first communications and the second communications during the first RAWs and the second RAWs, respectively, with at least one common wireless communication device included in both the first wireless communication device group and the second wireless communication device group.

3. The wireless communication device of claim 1, wherein the at least one of the processor or the communication interface is further configured to generate the plurality of beacons such that:
a first beacon includes a first RAW IE that specifies a first RAW for the first wireless communication device group; and
a second beacon includes a second RAW IE that specifies a second RAW for the second wireless communication device group.

4. The wireless communication device of claim 1, wherein the at least one of the processor or the communication interface is further configured to generate the plurality of beacons such that:
a first beacon includes a first RAW IE that specifies a first RAW for the first wireless communication device group; and
a second beacon includes a second RAW IE that specifies a second RAW for the second wireless communication device group and a third RAW for a third or the first wireless communication device group.

5. The wireless communication device of claim 1, wherein the first DTIM periodicity is a base DTIM periodicity and the second DTIM periodicity is an integer multiple of the base DTIM periodicity.

6. The wireless communication device of claim 1, wherein the at least one of the processor or the communication interface is further configured to support third communications with a third wireless communication device group during third RAWs having a third DTIM periodicity, wherein:
the first DTIM periodicity is a base DTIM periodicity;
the second DTIM periodicity is a first integer multiple of the base DTIM periodicity; and
the third DTIM periodicity is a second integer multiple of the base DTIM periodicity.

7. The wireless communication device of claim 1, wherein the at least one of the processor or the communication interface is further configured to generate the plurality of beacons such that one beacon includes a RAW IE that specifies two or more RAWs within one beacon interval for one wireless communication device group.

8. The wireless communication device of claim 1, further comprising:
an access point (AP), wherein the plurality of wireless communication devices including at least one of a wireless station (STA) or a smart meter station (SMSTA).

9. A wireless communication device comprising:
a communication interface; and
a processor, at least one of the processor or the communication interface configured to:
generate a plurality of beacons having a plurality of restricted access window (RAW) information elements (IEs) that specify a plurality of RAWs for a plurality of smart meter station (SMSTA) groups to communicate with the wireless communication device;
transmit the plurality of beacons to a plurality of SMSTAs;
support first communications with a first SMSTA group during first RAWs having a first delivery traffic indication message (DTIM) periodicity; and
support second communications with a second SMSTA group during second RAWs having a second DTIM periodicity that is an integer multiple of the first DTIM periodicity.

10. The wireless communication device of claim 9, wherein the at least one of the processor or the communication interface is further configured to support the first communications and the second communications during the first RAWs and the second RAWs, respectively, with at least one common SMSTA included in both the first SMSTA group and the second SMSTA group.

11. The wireless communication device of claim 9, wherein the at least one of the processor or the communication interface is further configured to generate the plurality of beacons such that:
a first beacon includes a first RAW IE that specifies a first RAW for the first SMSTA group; and
a second beacon includes a second RAW IE that specifies a second RAW for the second SMSTA group and a third RAW for a third or the first SMSTA group.

12. The wireless communication device of claim 9, wherein the communication interface is further configured to support third communications with a third SMSTA group during third RAWs having a third DTIM periodicity, wherein:
the first DTIM periodicity is a base DTIM periodicity;
the second DTIM periodicity is a first integer multiple of the base DTIM periodicity; and
the third DTIM periodicity is a second integer multiple of the base DTIM periodicity.

13. The wireless communication device of claim 9, wherein the at least one of the processor or the communication interface is further configured to generate the plurality of beacons such that one beacon includes a RAW IE that specifies two or more RAWs within one beacon interval for one SMSTA group.

14. A method for execution by a communication device, the method comprising:
  generating a plurality of beacons having a plurality of restricted access window (RAW) information elements (IEs) that specify a plurality of RAWs for a plurality of wireless communication device groups to communicate with the wireless communication device; and
  operating a communication interface for:
    transmitting the plurality of beacons to a plurality of wireless communication devices; and
    supporting first communications with a first wireless communication device group during first RAWs having a first delivery traffic indication message (DTIM) periodicity; and
    supporting second communications with a second wireless communication device group during second RAWs having a second DTIM periodicity.

15. The method of claim 14 further comprising:
  operating the communication interface for supporting the first communications and the second communications during the first RAWs and the second RAWs, respectively, with at least one common wireless communication device included in both the first wireless communication device group and the second wireless communication device group.

16. The method of claim 14 further comprising generating the plurality of beacons such that:
  a first beacon includes a first RAW IE that specifies a first RAW for the first wireless communication device group; and
  a second beacon includes a second RAW IE that specifies a second RAW for the second wireless communication device group and a third RAW for a third or the first wireless communication device group.

17. The method of claim 14, wherein the first DTIM periodicity is a base DTIM periodicity and the second DTIM periodicity is an integer multiple of the base DTIM periodicity.

18. The method of claim 14 further comprising:
  operating a communication interface for supporting third communications with a third wireless communication device group during third RAWs having a third DTIM periodicity, wherein:
    the first DTIM periodicity is a base DTIM periodicity;
    the second DTIM periodicity is a first integer multiple of the base DTIM periodicity; and
    the third DTIM periodicity is a second integer multiple of the base DTIM periodicity.

19. The method of claim 14, further comprising generating the plurality of beacons such that one beacon includes a RAW IE that specifies two or more RAWs within one beacon interval for one wireless communication device group.

20. The method of claim 14, wherein the wireless communication device including an access point (AP), and the plurality of wireless communication devices including at least one of a wireless station (STA) or a smart meter station (SMSTA).

* * * * *